(12) United States Patent
Mimura et al.

(10) Patent No.: US 6,360,069 B1
(45) Date of Patent: Mar. 19, 2002

(54) ROLLER FOR ELECTROPHOTOGRAPHIC SYSTEMS HAVING SURFACE ROUGHNESS ADJUSTED BY FINE PARTICLES

(75) Inventors: Kazuyoshi Mimura; Kenji Kobayashi; Susumu Fukuda; Hiroshi Ogoshi; Yasuo Fushiki, all of Otsu (JP)

(73) Assignee: Kaneka Corporation, Osaka (JP)

(*) Notice: Subject to any disclaimer, the term of this patent is extended or adjusted under 35 U.S.C. 154(b) by 0 days.

(21) Appl. No.: 09/446,633
(22) PCT Filed: Jun. 29, 1998
(86) PCT No.: PCT/JP98/02947
  § 371 Date: Dec. 23, 1999
  § 102(e) Date: Dec. 23, 1999
(87) PCT Pub. No.: WO99/01800
  PCT Pub. Date: Jan. 14, 1999

(30) Foreign Application Priority Data

| Jul. 1, 1997 | (JP) | 9-176143 |
| Sep. 10, 1997 | (JP) | 9-245081 |
| Nov. 27, 1997 | (JP) | 9-325880 |
| Dec. 4, 1997 | (JP) | 9-334122 |
| Dec. 9, 1997 | (JP) | 9-338750 |
| Jan. 21, 1998 | (JP) | 10-009869 |

(51) Int. Cl.$^7$ ............................................. G03G 15/08
(52) U.S. Cl. ........................................ 399/286; 492/30
(58) Field of Search ............................ 399/279, 286; 492/30, 59, 16

(56) References Cited

U.S. PATENT DOCUMENTS

| 4,994,319 A | * | 2/1991 | Nojima et al. | 428/335 |
| 5,434,653 A | * | 7/1995 | Takizawa et al. | 492/59 |
| 5,565,986 A | * | 10/1996 | Sawa et al. | 399/286 |
| 5,666,626 A | * | 9/1997 | Takizawa et al. | 399/286 |
| 5,697,027 A | * | 12/1997 | Takagi et al. | 399/279 |
| 5,878,313 A | * | 3/1999 | Takagi et al. | 399/279 |
| 5,953,557 A | * | 9/1999 | Kawahara | 399/88 |
| 6,067,434 A | * | 5/2000 | Takagi et al. | 399/286 |

FOREIGN PATENT DOCUMENTS

| JP | 4-301663 | | 10/1992 |
| JP | 8-179619 | | 7/1996 |
| JP | 10-39614 | | 2/1998 |
| JP | 10-254235 | * | 9/1998 |

* cited by examiner

*Primary Examiner*—Quana M. Grainger
(74) *Attorney, Agent, or Firm*—Armstrong, Westerman & Hattori, LLP

(57) ABSTRACT

A developing roller (10) comprising an elastic layer (12) wound round a conductive shaft (11) and one or more resin layers (13) laminated on the elastic layer. The elastic layer (12) has a JIS A hardness of not greater than 50 degrees. At least the outermost layer of the one or more resin layers (13) contains fine particles and the surface roughness ($R_z$) of the outermost layer is regulated to be within the range of 3 to 15 μm. A resin composition containing an —NHCO— bound or a resin composition containing —ROCO$_2$— and —SiOSi— repeating units and an —NHCO— bond can be used for the outermost layer.

16 Claims, 3 Drawing Sheets

ROLLER FOR ELECTROPHOTOGRAPHIC SYSTEMS HAVING SURFACE ROUGHNESS ADJUSTED BY FINE PARTICLES

TECHNICAL FIELD

The present invention pertains to a developing roller incorporated in a developing device, which uses a nonmagnetic one-component developing agent, of an image-forming device that employs an electrophotographic system, such as a copying machine, printer, a facsimile receiver, etc.

BACKGROUND ART

Various types of rollers, such as charged rollers and transfer rollers, developing rollers, etc., are placed around the electrostatic latent image carrier, such as a photosensitive body, etc., in image-forming devices that use electrophotographic systems. The developing roller has the role of conveying toner to the electrostatic latent image carrier, such as a photosensitive body, etc., and making the electrostatic latent image visible.

FIG. 1 shows a typical diagram of developing device 1 that uses a nonmagnetic developing system. This developing device is constructed from developing roller 2, toner receptacle 4 that holds toners 3, 3 . . . consisting of nonmagnetic 1-component developing agent, regulating blade 5, and feed roller 6, etc. Above-mentioned developing roller 1 is made by forming conductive elastic layer 8 around conductive shaft 7, which consists of SUS, aluminum alloy, conductive resin, etc., and forming a single or several resin layers 9 around this conductive elastic layer 8. Direct-current voltage or alternating-current voltage is applied between this developing roller and the photosensitive body. Moreover, feed roller 6 is installed in order to facilitate deposition of toner on the surface of the developing roller. Developing treatment by this type of developing device 1 is performed as follows: First, toner is deposited on the roller surface and developing roller 2 thereby charges this toner by contact or by friction. Next, the charged toner is pressed by regulating blade 5 and further uniformly charged as a toner layer of the desired thickness is produced. Moreover, this toner layer is adsorbed by the electrostatic latent image on photosensitive body 10 and the electrostatic image is thereby made visible to form a toner image. This toner image is transferred to recording paper and then the transferred image on the recording paper is fixed by heat or by pressing.

Polyamide resin comprising —NHCO— bonds and polyurethane resin have often been used for the outermost layer of developing rolls in order to improve the minus charging properties of toners (Japanese Patent Publication (Kokoku) No. 50(1975)-13661). However, there were problems with using these resins as the outermost layer in that there is a reduction in the minus charge of the toner under high-temperature and high-humidity environments and further, there is a problem in that the phenomenon whereby toner is fixed on the roller surface with long-term use (referred to as "toner filming" below) occurs, preventing the formation of a toner layer, even under ordinary environments.

Therefore, polycarbonate was used as the main component of the outermost layer. As a result, consistent results were obtained in preventing a reduction in the minus charge of the toner under a high-temperature, high-humidity environment. Moreover, in order to prevent toner filming, silicone-modified polycarbonate was also used as the main component of the outermost layer (Japanese Patent Laid-Open No. 9(1997)-244392). However, since the silicone content of the outermost layer is high and hardness of the outermost layer is high with developing rollers that use this type of outermost layer, there is a problem in that the outermost layer is easily scratched and there is a reduction in durability of the developing roller.

Moreover, there has been a tendency in recent years toward the use of toner with a low melting point of approximately 80° C. or lower in order to efficiently fix transferred images on recording paper. When this type of low-melting-point toner is used, not only toner filming, but also fusion of toner on the adjusting blade, occur and a toner layer of the desired thickness is not formed and problems such as image irregularities, etc., readily occur. The above-mentioned problems of toner filming when a low-melting-point toner is used and of fusion of toner on the adjusting blade that are encountered with developing rollers that use polycarbonate or silicone-modified polycarbonate as the main component of the outermost layer have not been successfully conquered Moreover, there are contact developing systems whereby the surface of the developing roller is brought into contact with photosensitive body and non-contact systems whereby a space is made between this surface and the photosensitive body. Voltage is applied between the photosensitive body and the developing roller with both the contact and the non-contact systems, but it is particularly necessary to apply alternating-current voltage between the photosensitive body and the developing roller by the non-contact contact system because the toner will fly in the above-mentioned space. It is necessary that the developing roller and photosensitive body have a specific contact width (referred to below as the "nip width") by the contact system. Irregularities in the image will be produced and the image quality will be poor if this nip width fluctuates and therefore, surface hardness of the developing roller must be set at an appropriate range. Moreover, there are problems with the non-contact system in that outer diameter of the roller will change with changes in humidity and changes in temperature and as a result, the space width between the developing roller and photosensitive body will change, leading to irregularities in the image.

In light of the above-mentioned problems, the purpose of the present invention is to prevent a reduction in the charge of the toner under high-temperature, high-humidity environments and prevent toner filming and fusion of toner on the regulating blade. Moreover, the purpose of the present invention is also to prevent fluctuations in nip width and in space width with changes in temperature and changes in humidity.

DISCLOSURE OF THE INVENTION

The first developing roller of the present invention is characterized in that by means of a developing roller that is made by lamination of one or several elastic layers around a conductive shaft and one or several resin layers on said elastic layer, the above-mentioned elastic layer has a JIS A hardness of 50 degrees or less, of the above-mentioned single or several resin layers, at least the outermost layer contains fine particles, and surface roughness of said outermost layer ($R_z$) is adjusted to within a range of 3 to 15 $\mu$m. Furthermore, above-mentioned surface roughness ($R_z$) is the value in accordance with Japanese Industrial Standard (JIS) B 0601-1994.

The mean particle diameter of the above-mentioned fine particles should be within a range of 5 to 50 $\mu$m, particularly 10 to 50 $\mu$m.

Moreover, it is preferred that, of the single or several resin layers formed around the elastic layer, at least the outermost layer consist of resin comprising —NHCO— bonds, for instance, polyamide resin or polyurethane resin. Moreover, this resin composition can comprise repeating units of —$ROCO_2$—, such as polycarbonate. Furthermore, it is further preferred that these resin compositions comprise repeating units of —SiOSi—.

And, it is also possible that of the single or several resin layers that are formed around the elastic layer, at least the outermost layer consists of a resin composition comprising acrylic-vinyl acetate copolymer.

Moreover, urethane or nylon material should be used as the above-mentioned fine particles from the point that the particles impart a negative charge to the toner.

It is preferred that the above-mentioned elastic layer consists of a reaction product of a curable composition whose main components are (A) polymer comprising at least 1 alkenyl group in its molecules and whose repeating units constructing its main chain consist of mainly oxyalkylene units or saturated hydrocarbon units, (B) curing agent comprising at least 2 hydrosilyl groups in its molecules, (C) hydrosilylation catalyst, and (D) conductivity-imparting agent.

Moreover, the thickness of the outermost layer containing the fine particles should be within a range of 5 to 50 $\mu$m.

Moreover, an outermost layer with a tensile elongation in conformance with Japanese Industrial Standards (JIS) K 6251 within a range of 300 to 600% should be used as the above-mentioned outermost layer. It is further preferred that the above-mentioned tensile elongation be adjusted to within a range of 400 to 600%, preferably 500 to 600%.

Moreover, it is preferred that roller resistance before coating the single or several resin layers around the elastic layer be $10^4 \Omega$ or higher, and that the roller resistance after coating said resin layers be within a range of $10^4$ to $10^{10}\Omega$, particularly $10^5$ to $10^8 \Omega$.

Moreover, it is preferred that capacitance before coating the single or several resin layers around the elastic layer ($C_1$) be adjusted to within a range of 0.8 to 20 nF, and that capacitance after coating with said resin layers ($C_2$) be adjusted to within a range of 2.5 nF or less.

The above-mentioned developing roller can be used in combination with any developing device that employs the nonmagnetic contact system.

Next, with respect to the second developing roller of the present invention, by means of a developing roller that is made by laminating a single or several elastic layers around a conductive shaft and then laminating a single or several resin layers on said elastic layer, the above-mentioned elastic layer has a JIS A hardness of 50 degrees or less, and the above-mentioned outermost layer has fine particles protruding from its surface because, of the above-mentioned single or several resin layers, at least the outermost layer contains fine particles. Furthermore, the second developing roller of the present invention is characterized in that when height of the fine particles protruding from the above-mentioned surface is L, toner mean particle diameter is $r_{av}$, and mean distance between the fine particles that protrude from the above-mentioned surface is $D_{av}$, the correlation of $r_{av} \leq D_{av} \leq 80L$ is established with respect to the fine particles that satisfy the correlation $r_{av}/4 \leq L \leq 4r_{av}$.

In this case, the mean particle diameter $r_{av}$ of the above-mentioned toner should be within a range of 5 to 10 $\mu$m.

This type of developing roller can be used in combination with any developing device that employs the nonmagnetic contact system.

BRIEF DESCRIPTION OF THE DRAWINGS

The developing rollers of the present invention will be described in detail below while referring to FIGS. 2 through 4.

Figure 1:
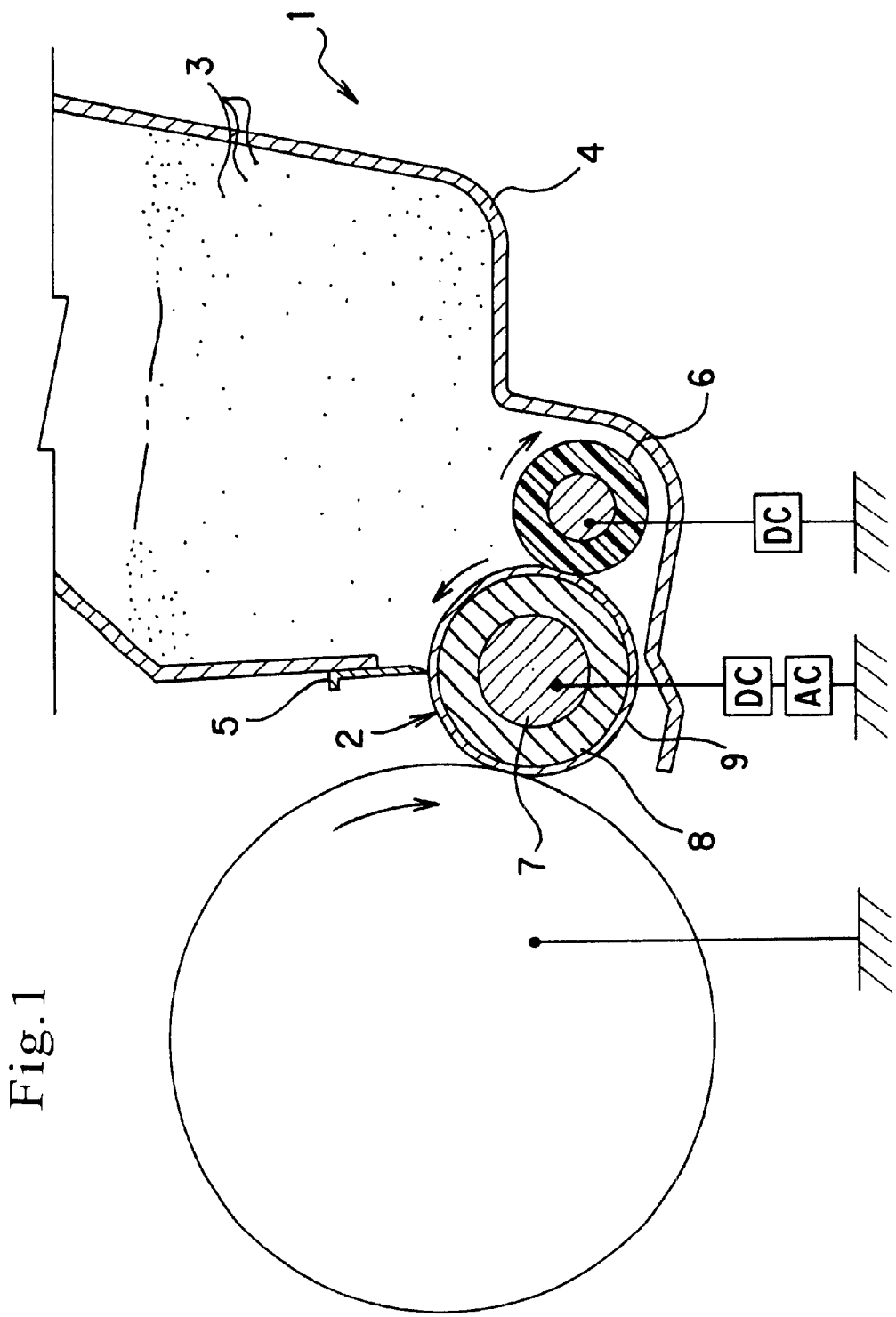
FIG. 1 is a typical diagram of a developing device that employs a nonmagnetic developing system.
Figure 2:
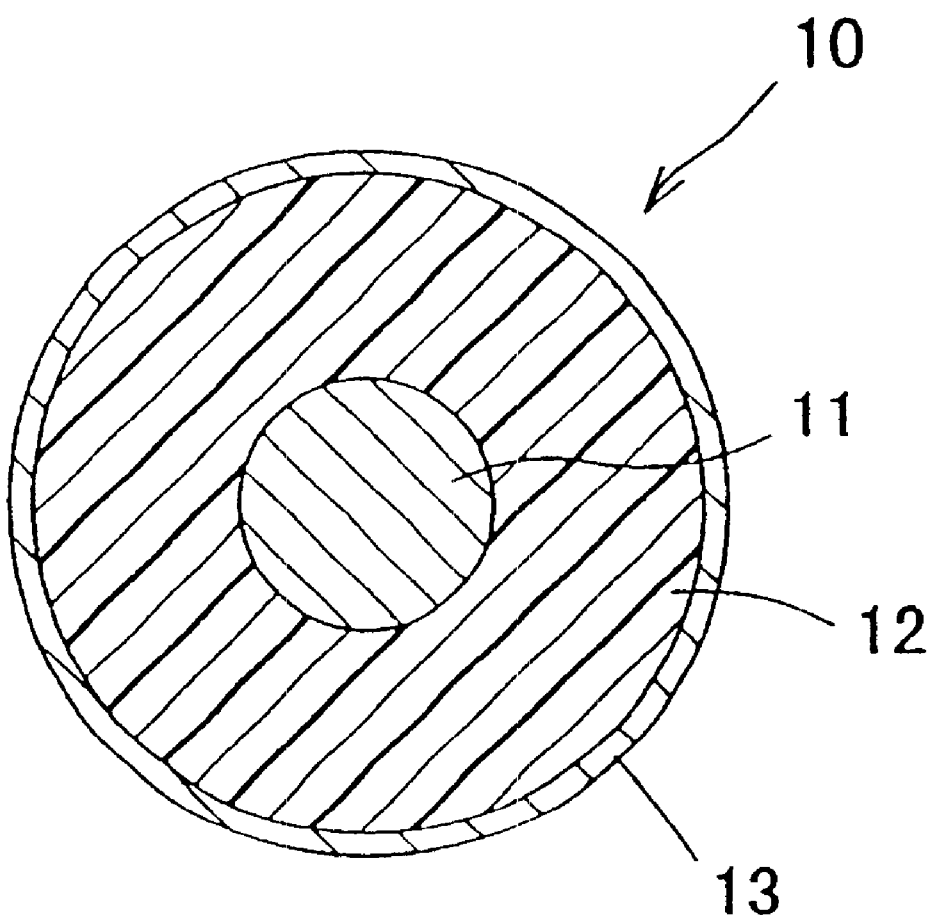
FIG. 2 is a typical diagram of the cross section of the developing roller of the present invention.

As shown in FIG. 2, developing roller 10 of the present invention is made by forming conductive elastic layer 12 with a Japanese Industrial Standards (JIS) A hardness of 50 degrees or less, preferably 30 degrees or less, around conductive shaft 11, which consists of stainless steel, aluminum alloy, conductive resin, etc., and has a diameter of 1 mm to 25 mm, and then forming an single or several resin layers 13 with a thickness of 5 to 50 $\mu$m around this conductive elastic layer 12. Moreover, many fine particles are dispersed in at least the outermost layer of above-mentioned resin layers 13, and some of these fine particles protrude from the surface of the outermost layer. For reasons mentioned later, surface roughness ($R_z$) of this outermost layer is adjusted to within a range of 3 to 15 $\mu$m, preferably 5 to 10 $\mu$m, in accordance with JIS B 0601-1994. Furthermore, above-mentioned resin layer 13 can comprise an adhesive layer as the layer underneath the outermost layer in order to increase adhesion with the conductive elastic layer. Moreover, there can also be a resistance-adjusting layer for adjusting roller resistance of the developing roller as the layer underneath the outermost layer.

By adjusting the JIS A hardness of the above-mentioned conductive elastic layer to within the above-mentioned range (50 degrees or less, preferably 30 degrees or less), the conductive elastic layer absorbs to the desired degree the pressure received from the regulating blade and prevents cracking of the toner particles. Consequently, it is possible to prevent large fluctuations in charge distribution of the toner and density irregularities and fogging of the image due to cracking of the toner particles. Moreover, as a result, fluctuations in nip width between the photosensitive body and developing roller can be prevented and therefore, a reduction in image quality can be prevented in the case of a contact developing system.

Figure 3:
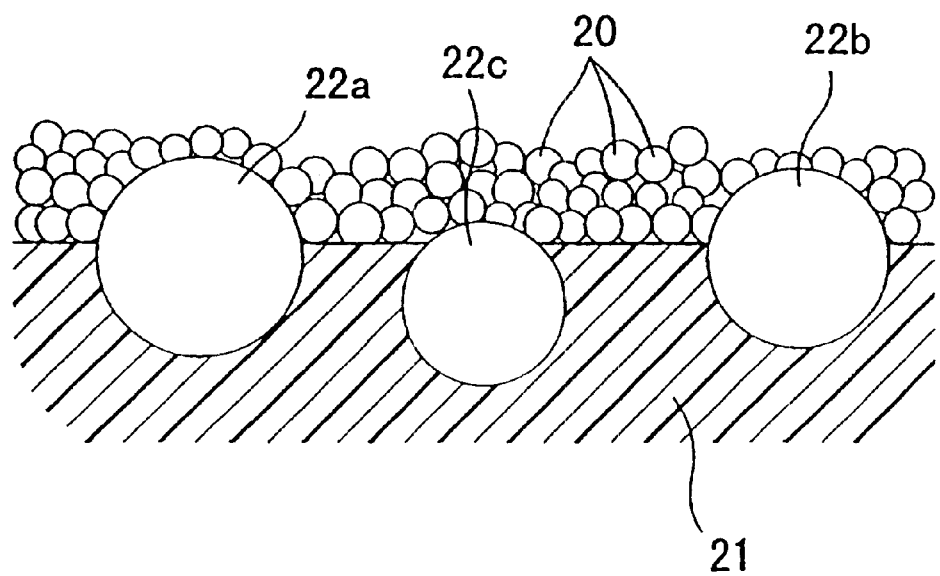
FIG. 3 is a typical diagram showing fine particles protruding from the surface of the outermost layer and toner deposited on this surface in the present invention.
Figure 4:
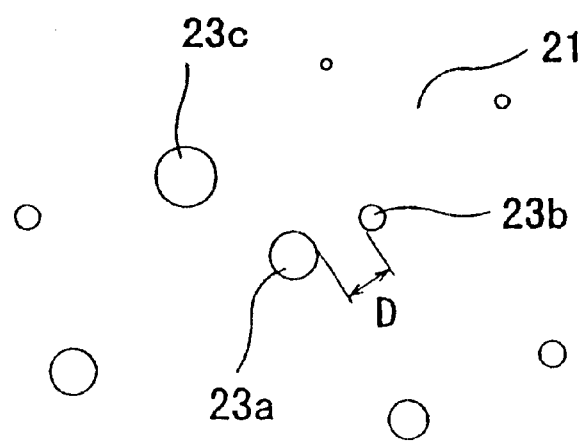
FIG. 4 is an enlargement of the surface of the outermost layer of the developing roller of the present invention.

FIG. 3 is a typical example of the state where toner inside the toner receptacle has been deposited on the developing roller surface. Deposited toners 20, 20 . . . are distributed closely between fine particle 22a and fine particle 22b (or 22c) protruding from the surface of the outermost layer 21. Next, these toners 20, 20 . . . are pushed by the regulating blade to form a toner layer with a thickness that is 1-fold to 4-fold, preferably 1-fold to 3-fold, the mean particle diameter of the toner. In this case, some of the pressure from the regulating blade is shouldered by protruding fine particles 22a, 22b, 22c . . . and therefore, the stress applied to the toner is less than when there are no protruding fine particles.

From this type of viewpoint, by means of the present invention, surface roughness ($R_z$) is adjusted to within a range of 3 to 15 $\mu$m, preferably 5 to 10 $\mu$m, as the degree to which the fine particles protrude from the surface layer.

Thus, even if, for instance, a low-melting-point toner is used, fusion of the toner on the regulating blade and toner filming are prevented. Furthermore, it is preferred that the fine particles be harder than the resin of the outermost layer in terms of alleviating the stress applied to the toner.

The above-mentioned toner has an average particle diameter of 5 to 10 μm, preferably 6 to 8 μm. Moreover, the toner can be, for instance, coloring pigment coated with styrene acrylic or polyester thermoplastic resin, etc.

It is preferred that urethane or nylon material be used as the above-mentioned fine particles in terms of the imparting a negative charge to the toner. The average particle diameter of the fine particles is 5 to 50 μm.

Moreover, roller resistance before coating the above-mentioned resin layer should be adjusted to $10^4 \Omega$ or more, and roller resistance after coating said resin layer should be adjusted to within a range of $10^4$ to $10^{10} \Omega$, particularly $10^5$ to $10^8 \Omega$. Leaking of photosensitive body and toner filming can be prevented by adjusting roller resistance after resin layer coating to within a range of $10^4$ to $10^{10} \Omega$, particularly $10^5$ to $10^8 \Omega$. Moreover, by adjusting roller resistance before resin layer coating to $10^4 \Omega$ or higher, the difference from roller resistance after resin layer coating is controlled and therefore, the generation of defects such as pin holes in the resin layer can be prevented.

The method of determining roller resistance in this invention is performed by the following procedure in (1) through (3). (1) The roller is horizontally brought into contact with a metal plate horizontally and a load of 500 g is applied to the end of the shaft in the direction of the metal plate. (2) Direct-current voltage of 100 volts is applied between the shaft and metal plate and current is measured. (3) Roller resistance is calculated from this current and the direct-current voltage.

Thereupon, capacitance ($C_1$) before coating the above-mentioned resin layer should be adjusted to within a range of 0.8 to 20 nF, while capacitance ($C_2$) after coating said resin layer should be adjusted to within a range of 2.5 nF or less. As a result, toner filming is prevented. The reason for this appears to be as follows: Immediately after toner that has been deposited on the surface of the developing roller is transferred to the photosensitive body, the charge on this surface becomes the same as absolute value of the total charge of the toner that has been transferred and a charge of the opposite polarity remains on that surface. If this residual charge is not neutralized in a short amount of time by a charge introduced from the shaft, the toner that has not been used in development will be electrostatically adsorbed on the surface of the developing roller and toner filming will readily occur. The developing roller becomes like an electric circuit where elastic layer and a single or several resin layers are connected in series. Thus, if above-mentioned capacitance $C_2$ is small enough, the constant (product of electrostatic capacitance and roller resistance) will be small and the above-mentioned residual charge can be neutralized within a short amount of time. By means of the developing roller of the present invention, the above-mentioned residual charge is neutralized within a short amount of time by bringing the maximum capacitance after resin layer coating ($C_2$) to 2.5 nF when capacitance before resin layer coating ($C_1$) is within a range of 0.8 to 20 nF and therefore, toner filming is prevented.

Thereupon, if elasticity of the above-mentioned outermost layer is too low, the outermost layer will have high viscosity and toner filming will occur. On the other hand, if outermost layer elasticity is too high, the outermost layer will not be able to deform with the conductive elastic layer when the developing roller pushes against the regulating blade and the photosensitive body and image irregularities will be produced. Moreover, since there is an increase in stress on the toner deposited on the surface of the developing roller at this time, toner will fuse to the regulating blade and further, the toner particles will crack. Therefore, there will be large fluctuations in the toner charge distribution and density irregularities and fogging of the image will be produced. Moreover, when the developing system is a contact system, it is necessary to adjust elasticity of the outermost layer and keep nip width within the desired range.

For the above-mentioned reasons, it is preferred that the mixture percentage of resin component in the outermost layer be adjusted and the 100% modulus of the resin composition of the outermost layer thereby be adjusted to within a range of $5 \times 10^6$ to $30 \times 10^6$ Pa, preferably $8 \times 10^6$ Pa to $20 \times 10^6$ Pa, Thereupon, in order to prevent fusion of toner on the regulating blade and toner filming, the correlation of $r_{av} \leq D_{av} \leq 80L$ should be established for fine particles that satisfy the correlation $r_{av}/4 \leq L \leq 4r_{av}$ when mean particle diameter of the toner is $r_{av}$, height of the protruding fine particles from the outermost layer surface is L, and mean distance between protruding fine particles is $D_{av}$.

The reason for this is explained below: The stress applied to the toner is related to the degree of protruding particle distribution. As shown in FIG. 4, fine particles 23a, 23b, 23c ... protruding from outermost layer 21 are distributed at the developing roller surface at various heights and surface densities. If this surface density is too high, the surface of the outermost layer is all but covered with fine particles and as a result, there is a marked reduction in the number of toner supported between protruding particles and the stress applied to the toner is too high. On the other hand, if surface density is too high, not enough fine particles will receive enough pressure from the regulating blade and too much stress will be applied to the toner. In addition, if average height of the protruding part of the fine particles is too high, thickness of the toner layer will exceed the above-mentioned desired range (1-fold to 4-fold, preferably 1-fold to 3-fold the average particle diameter of the toner), and there will be an increase in toner residue that is not for development at the developing roller surface once toner has been transferred to the electrostatic latent image of the photosensitive body and as a result, toner filming will readily occur.

For this type of reason, by means of the present invention, the fine particles are distributed so that the correlation of $r_{av} \leq D_{av} \leq 80L$ will be established for fine particles that satisfy the correlation $r_{av}/4 \leq L \leq 4r_{av}$.

Determination of the mean distance between protruding fine particles ($D_{av}$) is performed by the following procedure (1) through (3). Furthermore, the mean particle diameter ($r_{av}$) of the toner will be predetermined.

(1) A specific region on the surface of the developing roller is sampled and height (L) from the surface of the protruding fine particles within this sampling region is measured using a 3-dimensional scanning electron microscope, etc.

(2) Fine particles with a height satisfying the correlation $r_{av}/4 \leq L \leq 4r_{av}$ are sampled.

(3) The shortest distance between adjacent protruding fine particles is determined one-by-one for these delineated fine particles. For instance, the shortest distance between fine particle 23a and its adjacent fine particle in FIG. 4 is distance (D) to fine particle 23b.

(4) The arithmetical average of these shortest distances serves as average distance ($D_{av}$).

[Outermost Layer]

The outermost layer of the present invention will now be described below:

The outermost layer should consist of a resin comprising —NHCO— bonds, such as polyurethane and polyamide. This type of resin provides the outermost layer of the developing roller with the appropriate elasticity and toner charging property.

Moreover, the outermost layer can also be made from a resin such as polycarbonate urethane that comprises both —NHCO—bonds and —$R^1OCO_2$— repeating units in 1 molecule. This type of resin is characterized in that in addition to the appropriate elasticity and toner charging property of the resin comprising —NHCO— bonds, a low coefficient of water absorption and low dielectric constant can be maintained, even under high-temperature and high-humidity environments. Consequently, the outermost layer consisting of this type of resin controls fluctuations in roller resistance and fluctuations in the outer diameter of the developing roller under high-temperature and high-humidity environments and thereby controls fluctuations in nip width and fluctuations in the space width between the developing roller and the photosensitive body and therefore, a reduction in image quality can be prevented. Polycarbonate urethane is particularly preferred because in addition to being readily obtained, it can be diluted with solvent and readily applied by dip application and spray application, etc.

Bisphenol A groups are generally used as the $R^1$ of the above-mentioned —$R^1OCO_2$— repeating units, but the $R^1$ of the present invention is not limited to these and can also be alicyclic groups, alkyl groups, etc. The use of alkyl groups as $R^1$ is particularly preferred in terms of obtaining a resin with good balance between low hardness and low coefficient of water absorption.

Moreover, the resin of the outermost layer can also be a resin blend of a resin comprising —NHCO— bonds and resin comprising repeating units of —$R^1OCO_2$—. Examples of resin blends are blends of polycarbonate and polyamide or polyurethane diluted with tetrahydrofuran (THF), dimethyl formamide (DMF), etc.

When producing the above-mentioned polycarbonate urethane, polycarbonate polyol and polyisocyanate are reacted in the presence of an appropriate solvent or without a solvent using a chain extender as needed. The above-mentioned chain extender can be a conventional chain extender such as glycol, amine, polyhydric alcohol, aliphatic polyamine, aromatic polyamine, etc.

The above-mentioned polycarbonate polyol is a conventional material obtained by condensation of a polyhydric alcohol and phosgene, chloroformic acid ester, dialkyl carbonate, or diallyl carbonate. Preferred examples of polycarbonate polyols are obtained using 1,6-hexanediol, 1,4-butanediol, 1,3-butanediol, 1,5-pentanediol, etc., as the polyhydric alcohol, and have a number-average molecular weight (Mn) within a range of 300 to 15,000. This type of polycarbonate polyol is preferably used alone, but it can also be concomitantly used with polyester polyol, polyether polyol, or polyester polyether polyol, which are conventional materials for producing polyurethane. Moreover, the polycarbonate polyol can also be an aromatic or alicyclic polyol (mainly diol).

Tolylene diisocyanate (TDI), 4,4-diphenylmethane diisocyanate (MDI), xylene diisocyanate (XDI), hexamethylene diisocyanate (HDI), hydrogenated MDI or isophorone diisocyanate (IPDI), etc., are used with the isocyanate that reacts with this type of polycarbonate polyol. Of these, hydrogenated MDI or IPDI are preferred taking into consideration the balance between toxicity, cost, ease of obtaining, and low hardness.

However, resins comprising —NHCO— bonds and —SiOSi— repeating units, or resins comprising —NHCO— bonds, —$R^1OCO_2$— repeating units, and —SiOSi— repeating units are preferred as the resin of the outermost layer. This is because when the outermost layer contains —SiOSi— repeating units, cohesive energy of the outermost layer is reduced when the resin of the outermost layer contains —SiOSi— repeating units and the outermost layer will have good toner release performance, preventing toner filming.

This type of resin is obtained by reacting polyol and isocyanate in the presence of an appropriate solvent or without a solvent, using a chain extender as needed. In this case, polysiloxane polyol comprising —SiOSi— bonds is used for part of the above-mentioned polyol, or polyol comprising —SiOSi— bonds in its molecules is used as the above-mentioned chain extender. Furthermore, reaction intermediate of polysiloxane polyol and isocyanate where either of the reactive groups of the above-mentioned polysiloxane polyol or the isocyanate groups of the above-mentioned isocyanate remain can also be used.

Conventional polyol for polyurethane, such as polyethylene diadipate, polyethylene butylene adipate, polytetramethylene ether glycol, poly- -caprolactone diol, polycarbonate polyol, polypropylene glycol, etc., are examples of the above-mentioned polyol. Of these, polycarbonate polyol is preferred in terms of preventing a reduction in toner charge under high-temperature and high-humidity environments. Aliphatic or alicyclic polycarbonate polyol, such as polyhexamethylene carbonate diol is preferred as this polycarbonate polyol.

Moreover, the polysiloxane polyols with the following chemical formulas I through IV are examples of polyols comprising —SiOSi— bonds that can be easily obtained:

Chemical formula I (I)

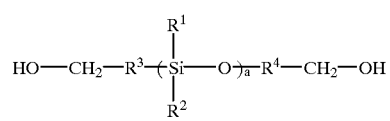

(In the formula, a is an integer of 2 or more. $R^1$ and $R^2$ are alkyl groups, fluoroalkyl groups, cycloalkyl groups, aryl groups, or substituted aryl groups, and $R^3$ and $R^4$ are alkylene groups or substituted alkylene groups.)

Chemical formula II (II)

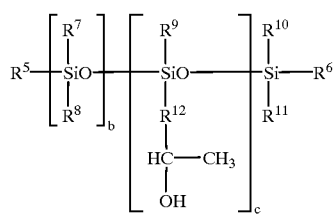

(In the formula, b is an integer of 1 or more and c is an integer of 2 or more. $R^5$ through $R^{11}$ are alkyl groups, fluoroalkyl groups, cycloalkyl groups, aryl groups or substituted aryl groups, and $R^{12}$ is an alkylene group or a substituted alkylene group.

Chemical formula III

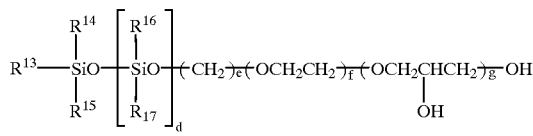

(III)

(In the formula, d, e, f, and g are integers of 1 or more. $R^{13}$ through $R^{17}$ are alkyl groups, fluoroalkyl groups, cycloalkyl groups, aryl groups or substituted aryl groups.)

Chemical formula IV

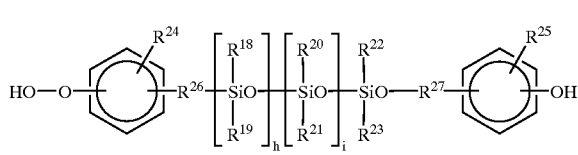

(IV)

(In the formula, h and i are integers of 1 or more. $R^{18}$ through $R^{25}$ are alkyl groups, fluoroalkyl groups, cycloalkyl groups, aryl groups or substituted aryl groups, and $R^{26}$ and $R^{27}$ are alkylene groups or substituted alkylene groups.)

The polysiloxane polyol in above-mentioned chemical formulas I through IV can react with isocyanate as the main chain, or as the side chain.

Conventional 4,4'-diphenylmethane diisocyanate (MDI), cyclohexane diisocyanate, hydrogenated MDI, isophorone diisocyanate, 1,3-xylylene diisocyanate, 2,4-tolylene diisocyanate, 2,6-tolylene diisocyanate, etc., are examples of this type of isocyanate that reacts with this type of polyol. Furthermore, urethane prepolymer that has been obtained by reacting these isocyanates and polyols and polyamine so that the molecular ends have isocyanate groups can also be used.

In addition, ethylene glycol, propylene glycol, 1,4-butanediol, 1,6-hexanediol, ethylene diamine, trimethylene diamine, tetramethylene diamine, hexamethylene diamine, isophorone diamine (IPDA), hydrazine, etc., are examples of the above-mentioned chain extender.

The outermost layer resin can also be acrylic-vinyl acetate copolymer. This acrylic-vinyl acetate copolymer is a copolymer of one or both of acrylic acid ester monomer and methacrylic acid ester monomer and vinyl acetate. In terms of keeping viscosity of the outermost layer low, it is preferred that the copolymer comprise 50 wt % or more, particularly 80 wt % or more, acrylic acid ester monomer or methacrylic acid ester monomer. Moreover, in terms of improving the minus charge acceptance of the toner, it is preferred that the copolymer contain 3 wt % or more, particularly 5 wt % or more, further, 10 wt % or more, vinyl acetate.

Methyl acrylate, ethyl acrylate, butyl acrylate, 2-ethyl hexyl acrylate, etc., can be used as the above-mentioned acrylic acid ester monomer. Moreover, methyl methacrylate, ethyl methacrylate, butyl methacrylate, etc., can be used as the above-mentioned methacrylic acid ester monomer.

Dip application, spray application, roll coat or brush application, etc., are used for the method of forming the outermost layer, depending on viscosity of the resin component of the outermost layer, etc. Moreover, the outermost layer can also be formed by applying prepolymer to the conductive elastic layer and drying (depending on the case, cured) and reacting at a specific temperature.

[Conductive Elastic Layer]

The above-mentioned conductive elastic layer will now be described below:

It is particularly preferred that the conductive elastic layer consists of a reaction product of a curable composition whose main components are (A) polymer that comprises at least 1 alkenyl group in its molecules and where the repeating units constructing its main chain mainly consist of oxyalkylene units or saturated hydrocarbon units, (B) curing agent with at least 2 hydrosilyl groups in its molecules, (C) hydrosilylation catalyst, and (D) conductivity-imparting agent.

The polymer of component (A) in this curable composition is the component that goes through hydrosilylation with component (B) and is cured. Since it has at least 1 alkenyl group in its molecules, hydrosilylation occurs to make the component polymer like and the product is cured. The number of alkenyl groups comprising component (A) must 1 at least one in terms of hydrosilylation with component (B), but it is preferred in terms of rubber elasticity that in the case of straight-chain molecules, 2 alkenyl groups be present at both ends of the molecule and in the case of branched-chain molecules, 2 or more alkenyl groups be present at the molecular ends. The main repeating units forming the main chain of component (A) are oxyalkylene units or saturated hydrocarbon units.

Polymer whose main repeating units that form its main chain are oxyalkylene units are preferred because volume resistance is brought to $10^8$ to $10^9$ Ωcm by adding a small amount of conductivity-imparting agent. Moreover, from the point of obtaining a cured product with a low hardness, oxyalkylene polymer where the above-mentioned repeating units are oxyalkylene units, and further, oxypropylene polymer where the above-mentioned repeating units are oxypropylene units, are preferred.

The above-mentioned oxyalkylene polymer is a polymer of which 30% or more, preferably 50% or more, of the units making the main chain consist of oxyalkylene units. In addition to the oxyalkylene units, the oxyalkylene polymer may comprise units from compounds used as the starting material for polymer production with 2 or more active hydrogens, such as ethylene glycol, bisphenol compounds, glycerin, trimethylol propane, pentaerythritol, etc.. Furthermore, when the oxyalkylene polymer is oxypropylene polymer, the polymer can be a copolymer with units consisting of ethylene oxide, butylene oxide, etc. (including graft copolymer).

In terms of obtaining good balance between reactivity and low hardness, the molecular weight of the oxyalkylene polymer of above-mentioned component (A) should be a number-average molecular weight (Mn) of 500 to 50,000, further, 1,000 to 40,000. A number-average molecular weight of 5,000 or higher, further, 5,000 to 40,000, is particularly preferred. If number-average molecular weight is less than 500, it will be difficult to obtain sufficient mechanical strength (rubber hardness, tensile elongation), etc., when the curable composition has been cured. On the other hand, if number-average molecular weight is too high, molecular weight per 1 alkenyl group comprising the molecule will be too high and reactivity will drop as a result of stearic hindrance. Therefore, curing often will be insufficient. Moreover, there will be a tendency toward viscosity being too high and workability being poor.

There are no special restrictions to the alkenyl groups of the above-mentioned oxyalkylene polymer, but alkenyl groups shown by the following general formula (1)

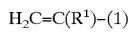

$$H_2C=C(R^1)-\quad(1)$$

(In the formula, $R^1$ is a hydrogen atom or methyl group.) are preferred for excellent curability.

Moreover, one characteristic of this curable composition is that its hardness can be easily reduced. The number of alkenyl groups needed to manifest this characteristic are 2 or more at the molecular ends. If there are too many alkenyl groups in comparison to molecular weight of component (A), the product will be stiff and it will be impossible to obtain good rubber elasticity.

In addition, when component (A) is a polymer whose main repeating units making its main chain are saturated hydrocarbon units, the water absorption coefficient will be low and there will be few environmental fluctuations in electrical resistance, which is preferred. As with the above-mentioned oxyalkylene polymer, this polymer is the component that goes through hydrosilylation with component (B) and curing. Since there is at least 1 alkenyl group in the molecules, hydrosilylation occurs to form a polymer-like substance and this substance is then cured. The number of alkenyl groups comprising component (A) must be at least 1 or more in terms of hydrosilylation with component (B), but in terms of rubber elasticity, there should be 2 present at both molecular ends in the case of a straight-chain molecule and 2 or more present at the molecular ends in the case of a branched molecule.

Typical examples of polymer where the main repeating units making the above-mentioned main chain are saturated hydrocarbon units are isobutylene polymer, hydrogenated isoprene polymer, and hydrogenated butadiene polymer. These polymers can comprise repeating units of other components, such as copolymer, etc., but it is important that they comprise at least 50% or more, preferably 70% or more, more preferably 90% or more, unsaturated hydrocarbon units so that the characteristic of a low coefficient of water absorption of saturated hydrocarbons will not be lost.

In terms of ease of handling, etc., the molecular weight of the polymer of component (A) whose main repeating units making its main chain are unsaturated hydrocarbon units is 500 to 50,000, further 1,000 to 15,000, by number-average molecular weight, and a polymer that is liquid and fluid at normal temperature is preferred in terms of workability.

The alkenyl groups introduced to this saturated hydrocarbon polymer are the same as in the case of the above-mentioned oxyalkylene polymer.

Consequently, straight-chain polyisobutylene, hydrogenated polybutadiene, hydrogenated polyisoprene polymer, etc., with 2 alkenyl groups at both ends and having a number-average molecular weight (Mn) of 2,000 to 15,000 and Mw/Mn of 1.1 to 1.2 are preferred actual examples of the polymer of component (1) with at least 1 alkenyl group in its molecules and whose main repeating units making the main chain are saturated hydrocarbon. Furthermore, Mw is the weight-average molecular weight.

Moreover, although there are no particular restrictions to component (B) of the curable composition as long as it is a compound with at least 2 hydrosilyl groups in its molecules, if the number of hydrosilyl groups contained in the molecules is too high, large amounts of hydrolsilyl groups will easily remain in the cured product becoming a source of voids and cracks and therefore, the number of hydrosilyl groups contained in the molecules should be 50 or less. Furthermore, there should be 2 to 30, preferably 2 to 20, hydrosilyl groups in terms of controlling rubber elasticity of the cured product and shelf life, and further, 20 or fewer hydrosilyl groups are needed in order to easily prevent bubbling during curing and even if the hydrosilyl groups are deactivated, 2 are necessary, the preferred range being 3 to 20, in order to avoid poor curing.

Furthermore, by means of the present invention, the above-mentioned 1 hydrosilyl group means that there is 1H bonded to Si. There are 2 hydrosilyl groups in $SiH_2$, but curability is better when the H bonded to the Si is bonded to different Si atoms. This is also preferred in terms of rubber elasticity.

Molecular weight of component (B) should be 30,000 or less, further 20,000 or less, particularly 15,000 or less, by number-average molecular weight (Mn) in terms of dispersability and roller workability when conductivity-imparting agent (component (D)) described below is added. When reactivity and solubility with component (A) is taken into consideration, 300 to 10,000 is preferred.

With respect to component (B), since cohesive force of component (A) is large in comparison to the cohesive force of component (B), modification to include phenyl groups is important in terms of solubility and styrene modified product, etc., is preferred in terms of solubility with component (A) and ease of obtaining, while α-methyl styrene modification is preferred in terms of shelf life.

There are no particular restrictions to the hydrosilylation catalyst that is component (C) as long as it can be used as a hydrosilylation catalyst. Platinum alone, solid platinum supported on alumina, etc., only, chloroplatinic acid (including complexes with alcohol, etc.), various platinum complexes, chlorides of metals, such as rhodium, ruthenium, iron, aluminum, titanium, etc., are examples. Of these, chloroplatinic acid, platinum-olefin complex, and platinum-vinyl siloxane complex are preferred in terms of catalytic activity. These catalysts can be used alone or 2 or more can be used together.

The ratio of use of component (A) and component (B) in the curable composition should be 0.2 to 5.0 moles, preferably 0.4 to 2.5 moles, hydrosilyl groups in component (B) per 1 mole alkenyl groups in component (A) in terms of rubber elasticity.

Moreover, the amount of component (C) used is $10^{-1}$ to $10^{-8}$ mole, further, $10^{-1}$ to $10^{-6}$ mole, particularly $10^{-3}$ to $10^{-6}$ mole, per 1 mole alkenyl groups in component (A). If the amount of component (C) used is less than $10^{-8}$ mole, the reaction will not proceed. On the other hand, hydrosilylation catalysts are generally expensive and they are corrosive and generate large quantities of hydrogen gas, causing the cured product to bubble. Therefore, the amount used should not exceed $10^{-1}$ mole.

Furthermore, when conductivity-imparting agent is added as component (D) to make a conductive composition, the curable composition is an ideal developing roller. Examples of the conductivity-imparting agent for this component (D) are compounds that can provide conductivity, including carbon black and metal micropowders, and further, organic compounds or polymers with quaternary ammonium salt groups, carboxylic acid groups, sulfonic acid groups, sulfuric acid ester groups, phosphoric acid ester groups, etc., compounds and polymers with conductive units represented by ether stearamide, ether imide copolymer, ethylene oxide-epihalohydrin copolymer, and methoxypolyethylene glycol acrylate, etc. These conductivity-imparting agents can be used alone, or 2 or more can be used together.

The amount of conductivity-imparting agent, which is component (D), should be 30 wt % or less in terms of the total amount of components (A) through (C) from the point of not increasing rubber hardness. In the other hand, in order to obtain uniform resistance, the amount should be 10 wt % or more. Therefore, the amount added should be determined from the property balance so that the necessary rubber hardness is obtained and volume resistance of the cured product is $10^3$ to $10^{10}$ Ωcm.

Furthermore, in addition to above-mentioned components (A) through (D), shelf life improvers, such as compounds with aliphatic unsaturated bonds, organic phosphorus compounds, organic sulfur compounds, nitrogen-containing compounds, tin compounds, organic peroxides, etc., can also be added. Actual examples are benzothiazole, thiazole, dimethyl malate, dimethyl acetylene carboxylate, 2-pentene nitrile, 2,3-dichloropropene, quinoline, etc., but they are not limited to these examples. Of these, thiazole and dimethyl malate are particularly preferred in terms of both pot life and fast curing. Furthermore, the above-mentioned shelf life improvers can be used alone, or 2 or more can be used together.

In addition, filler, shelf life stabilizer, plasticizer, ultraviolet ray absorbing agent, lubricant, pigment, etc., can be added to the above-mentioned curable composition to improve workability and cost.

The conductive elastic layer is formed around the above-mentioned conductive shaft by for instance, pouring, injection molding, extrusion molding, etc., the above-mentioned curable composition and elastic material, such as urethane rubber, silicone rubber, etc., into a mold with the conductive shaft made of SUS or aluminum alloy in the center and heating and curing the product at the appropriate temperature and for the appropriate time. In this case, the product can be post-cured after being semi-cured.

[Comparative Test 1]

The developing roller of the present invention will now be described with Examples 1 through 9 and these Examples 1 through 9 will be compared with Comparative Examples 1 and 2.

The developing roller of Examples 1 through 9 and Comparative Examples 1 and 2 has conductive elastic layer with a thickness of approximately 7.5 mm formed around a stainless steel shaft with a diameter of 10 mm and an outermost layer with a specific thickness is coated around the outside of this conductive elastic layer. This conductive elastic layer and outermost layer are the combinations of conductive elastic layers 1 through 3 and outermost layers 1 through 9 listed below:

Conductive Elastic Layer 1

Each component was mixed in accordance with the following mixture 1 and defoamed under reduced pressure for 120 minutes at 10 mmHg or less to obtain a resin composition. This resin composition was coated around a shaft and cured by being set aside for 30 minutes under an environment of 120° C. in the mold. JIS A hardness as specified by Japanese Industrial Standards (JIS) K 6301 of conductive elastic layer 1 obtained in this way was 15 degrees.

| Mixture 1 | |
|---|---|
| | Parts by weight |
| (A-1) Oxypropylene copolymer with terminal aryl groups (Number-average molecular weight (Mn) 8,000; molecular weight distribution 2) | 100 |
| (B-1) Polysiloxane curing agent (SiH value of 0.36 mole per 100 g) | 6.6 |
| (C-1) 10% isopropyl alcohol solution of chloroplatinic acid | 0.06 |
| (D-1) Carbon black (brand name "3030B", produced by Mitsubishi chemical Co., Ltd.) | 7 |

Conductive Elastic Layer 2

Each component was mixed in accordance with the following mixture 2 and defoamed under reduced pressure for 120 minutes at 10 mmHg or less to obtain a resin composition. This resin composition was coated around a shaft and cured by being set aside in the mold for 30 minutes under an environment of 120° C. JIS A hardness as specified by Japanese Industrial Standards (JIS) K 6301 of conductive elastic layer 2 obtained in this way was 15 degrees.

| Mixture 2 | |
|---|---|
| | Parts by weight |
| (A-2) Polyisobutylene polymer with 2 vinyl groups at the ends (Number-average molecular weight (Mn) 10,000) | 100 |
| (B-2) Polysiloxane curing agent (SiH value of 0.97 mole per 100 g) | 2.7 |
| (C-1) 10% isopropyl alcohol solution of chloroplatinic acid | 0.06 |
| (D-1) Carbon black (brand name "3030B", produced by Mitsubishi chemical Co., Ltd.) | 7 |
| (E-1) Plasticizer (brand name "PS-32", produced by Idemitsu Kosan Co., Ltd.) | 75 |

Conductive Elastic Layer 3

A composition of 5 g Ketjen black EC mixed per 100 g NBR rubber (brand name "Chemigum N683B", produced by Goodyear Co., Ltd.; bonded acrylonitrile content of 33%, Mooney viscosity of 28 (ML-4-100° C.)) was coated around a shaft by injection method to form conductive elastic layer 3. JIS A hardness as specified by Japanese Industrial Standards (JIS) K 6301 of conductive elastic layer 3 was 45 degrees.

Outermost Layer 1

Solid content of polycarbonate urethane (brand name "E980", produced by Nihon Mirakutoran Co., Ltd.) was diluted to 5% with a mixed solvent of DMF (N,N-dimethyl formamide):MEK (methyl ethyl ketone)=1:1 and set aside for 1 hour to make a solution. This solution was coated around the conductive elastic layer by dipping and dried to form outermost layer 1 with a thickness of approximately 15 μm. Surface roughness ($R_z$) of outermost layer 1 was approximately 1.9 μm.

Outermost Layer 2

Solid content of a mixture obtained with the following mixture 3 was diluted to 5% with a mixed solvent of DMF (N,N-dimethyl formamide):MEK (methyl ethyl ketone)=1:1 and set aside for 1 hour to make a solution. This solution was coated around the conductive elastic layer by dipping and dried to form outermost layer 1 with a thickness of approximately 20 μm. Surface roughness ($R_z$) of outermost layer 2 was approximately 3.1 μm.

| Mixture 3 | Parts by weight |
|---|---|
| Polycarbonate urethane (brand name "E980", produced by Nihon Mirakutoran Co., Ltd.) | 100 |
| Nylon fine particles (brand name "SP-500", produced by Toray Industories, Inc.;average particle diameter 5 μm) | 30 |

Outermost Layer 3

Solid content of the mixture obtained with the following mixture 4 was diluted to 5% with a mixed solvent of DMF (N,N-dimethyl formamide):MEK (methyl ethyl ketone)=1:1 and set aside for 8 hours to make a solution. This solution was applied around the conductive elastic layer by dipping and dried to form outermost layer 3 with a thickness of approximately 20 μm. Surface roughness ($R_z$) of outermost layer 3 was approximately 6.3 μm.

| Mixture 4 | Parts by weight |
|---|---|
| Polycarbonate urethane (brand name "E980", produced by Nihon Mirakutoran Co., Ltd.) | 100 |
| Urethane fine particles (brand name "Seikaseven UP0904", produced by Dainichiseika Co., Ltd.; average particle diameter 15 μm) | 20 |

Outermost Layer 4

Solid content of the mixture obtained with the following mixture 5 was diluted to 5% with a mixed solvent of DMF (N,N-dimethyl formamide):MEK (methyl ethyl ketone)=1:1 and set aside for 1 hour to make a solution. This solution was applied around the conductive elastic layer by dipping and dried to form outermost layer 4 with a thickness of approximately 16 μm. Surface roughness ($R_z$) of outermost layer 4 was approximately 3.6 μm.

| Mixture 5 | Parts by weight |
|---|---|
| Polycarbonate urethane (brand name "E980", produced by Nihon Mirakutoran Co., Ltd.) | 100 |
| Urethane fine particles (brand name "Seikaseven UP0908", produced by Dainichiseika Co., Ltd.; average particle diameter 7 μm) | 20 |

Outermost Layer 5

Solid content of the mixture obtained with the following mixture 6 was diluted to 5% with a mixed solvent of DMF (N,N-dimethyl formamide):MEK (methyl ethyl ketone)=1:1 and set aside for 8 hours to make a solution. This solution was applied around the conductive elastic layer by dipping and dried to form outermost layer 5 with a thickness of approximately 25 μm. Surface roughness ($R_z$) of outermost layer 5 was approximately 8.1 μm.

| Mixture 6 | Parts by weight |
|---|---|
| Polycarbonate urethane (brand name "E980", produced by Nihon Mirakutoran Co., Ltd.) | 100 |
| Urethan fine particles (brand name "Seikaseven UP0904", produced by Dainichiseika Co., Ltd. ; average particle diameter 15 μm) | 30 |

Outermost Layer 6

Solid content of the mixture obtained with the following mixture 7 was diluted to 5% with a mixed solvent of DMF (N,N-dimethyl formamide):MEK (methyl ethyl ketone)=1:1 and set aside for 1 hour to make a solution. This solution was applied around the conductive elastic layer by dipping and dried to form outermost layer 6 with a thickness of approximately 20 μm. Surface roughness ($R_z$) of outermost layer 6 was approximately 7.8 μm.

| Mixture 7 | Parts by weight |
|---|---|
| Polycarbonate urethane (brand name "E980", produced by Nihon Mirakutoran Co., Ltd.) | 100 |
| Acrylic fine particles (brand name "MX-1500", produced by Soken Kagaku K.K.; average particle diameter 13 μm) | 30 |

Outermost Layer 7

Solid content of the mixture obtained with the following mixture 8 was diluted to 5% with a mixed solvent of DMF (N,N-dimethyl formamide):MEK (methyl ethyl ketone) =1:1 and set aside for 1 hour to make a solution. This solution was applied around the conductive elastic layer by dipping and dried to form outermost layer 7 with a thickness of approximately 20 μm. Surface roughness ($R_z$) of outermost layer 7 was approximately 2.1 μm.

| Mixture 8 | Parts by weight |
|---|---|
| Polycarbonate urethane (brand name "E980", produced by Nihon Mirakutoran Co., Ltd.) | 100 |
| Acrylic fine particles (brand name "Epostar MA1006", produced by Nippon Shokubai Co., Ltd. ; average particle diameter of 5 μm) | 8 |

Outermost Layer 8

Solid content of the mixture obtained with the following mixture 9 was diluted to 5% with a mixed solvent of DMF (N,N-dimethyl formamide):MEK (methyl ethyl ketone)=1:1 and set aside for 1 hour to make a solution. This solution was applied around the conductive elastic layer by dipping and dried to form outermost layer 8 with a thickness of approximately 50 μm. Surface roughness ($R_z$) of outermost layer 8 was approximately 14.3 μm.

| Mixture 9 | Parts by weight |
|---|---|
| Polycarbonate urethane (brand name "E980", produced by Nihon Mirakutoran Co., Ltd. | 100 |
| Urethane fine particles (brand name "Seikaseven UP0902", produced by Dainichiseika Co., Ltd. ; average particle diameter 30 μm) | 8 |
| Urethane fine particles (brand name "Seikaseven UP0904", produced by Dainichiseika Co., Ltd.; average particle diameter of 15 μm) | 2 |

Outermost layer 9

Solid content of the mixture obtained with the following Mixture 10 was diluted to 5% with a mixed solvent of DMF (N,N-dimethyl formamide):MEK (methyl ethyl ketone)=1:1 and set aside for 1 hour to make a solution. This solution was applied around the conductive elastic layer by dipping and dried to form outermost layer 9 with a thickness of approximately 16 μm. Surface roughness ($R_z$) of outermost layer 9 was approximately 3.2 μm.

| Mixture 10 | Parts by weight |
|---|---|
| Ether urethane (brand name "Y-258", produced by Dainichiseika Co., Ltd.) | 100 |
| Urethane fine particles (brand name "Seikaseven UP0908", produced by Dainichiseika Co., Ltd. ; average particle diameter of 7 μm) | 20 |

The above-mentioned conductive elastic layers and outermost layers were combined as shown in Table 1 to make the developing rollers of Examples 1 through 9 and Comparative Examples 1 and 2. Moreover, the average shortest distance between fine particles ($D_{av}$) and the arithmetical average ($L_{av}$) of the height of the fine particles (L) protruding from the surface of the outermost layer are shown in Table 1. The method of determination of the average shortest distance between fine particles ($D_{av}$) is as described above. Furthermore, the average particle diameter of the toner used in these determinations is set at 10 μm.

TABLE 1

| | Conductive elastic layer No. | Outermost layer No. | Surface roughness ($R_z$) | Average shortest distance between fine particles ($D_{av}$) | Average protrusion ($L_{av}$) |
|---|---|---|---|---|---|
| Example 1 | 1 | 3 | 6.3 μm | 65 μm | 6.2 μm |
| Example 2 | 2 | 3 | 6.3 μm | 60 μm | 5.7 μm |
| Example 3 | 3 | 3 | 6.3 μm | 65 μm | 5.8 μm |
| Example 4 | 1 | 2 | 3.1 μm | 95 μm | 3.4 μm |
| Example 5 | 1 | 4 | 3.6 μm | 85 μm | 2.6 μm |
| Example 6 | 1 | 5 | 8.1 μm | 45 μm | 8.2 μm |
| Example 7 | 1 | 6 | 7.8 μm | 30 μm | 6.9 μm |
| Example 8 | 1 | 8 | 14.3 μm | 150 μm | 14.0 μm |
| Example 9 | 1 | 9 | 3.2 μm | 85 μm | 2.8 μm |
| Comparative Example 1 | 1 | 1 | 1.9 μm | None | None |
| Comparative Example 2 | 1 | 7 | 2.1 μm | 380 μm | 1.7 μm |

The experiments were performed by printing 3,000 black set-solid images using the developing roller in combination with a contact-type developing device. Average particle diameter of the nonmagnetic toner used in the experiments was 10 μm, and the melting point of the nonmagnetic toner was 78° C. Evaluation of the experiments was performed on the 2 points of (1) printing density and (2) fusion of toner to regulating blade.

(1) Evaluation of Printing Density

After printing 3,000 black set-solid images, density of the 3,000th black set-solid image was determined with a Macbeth densitometer. Density was evaluated as "A" (excellent) when this determination was 1.4 or higher and if it was 1.3 or higher but under 1.4, it was evaluated as "B" (good).

(2) Evaluation of Toner Fusion

After printing 3,000 black set-solid images, the regulating blade was macroscopically checked and toner fusion was evaluated as "A" (excellent) when there was almost no fusion of toner on the regulating blade, "B" (good) when there was slight fusion, and "C" (no good) when there was obvious fusion.

These experimental results are shown in Table 2. It is clear from the results in Table 2 that the developing roller of the example has good printing density and toner fusion is prevented when compared to the comparative examples.

TABLE 2

| | Printing density of 3,000th print | Toner Fusion |
|---|---|---|
| Example 1 | A | A |
| Example 2 | B | A |
| Example 3 | A | B |
| Example 4 | A | A |
| Example 5 | A | A |
| Example 6 | A | A |
| Example 7 | B | A |
| Example 8 | A | B |
| Example 9 | B | A |
| Comparative Example 1 | B | C |
| Comparative Example 2 | B | C |

[Comparative Experiment 2]

Next, the present invention will be described using Examples 10 through 18 of the developing roller of the present invention and these Examples 10 through 18 will be compared with Comparative Examples 3 through 5.

The developing rollers of Examples 10 through 18 and Comparative Examples 3 through 5 were made by forming a conductive elastic layer with a thickness of approximately 7.5 mm around a stainless steel shaft with a diameter of 10 mm and then coating an outermost layer of a specific thickness around the outside of this conductive elastic layer. The conductive elastic layer and outermost layer were a combination of above-mentioned conductive elastic layer 1 and outermost layers 10 through 21 listed below.

Outermost Layer 10

The mixture shown by the following mixture 11 was introduced to a 2,000 ml flask with 3 openings and reacted while being agitated for 3 hours under a 100° C. environment to obtain prepolymer with NCO groups at the molecular ends. After this prepolymer was cooled to 50° C., it was mixed with 580 g DMF (dimethyl formamide) to obtain a solution. Then 16 g IPDA (isophorone diamine) were gradually added dropwise to this solution and a chain extension reaction (40° C., 3 hours) was performed to obtain solid content. Twenty parts by weight urethane fine particles (brand name "Seikaseven UP0904", produced by Dainichiseika Co., Ltd.; average particle diameter of 15 μm) were mixed per 10 parts by weight of this solid content. The outermost layer solution of this mixture diluted to approximately 6% with a mixed solution of DMF:MEK=1:1 was obtained. This outermost layer solution was coated around the conductive elastic layer by dipping and dried for 1 hour at 80° C. to form outermost layer 10. Surface roughness ($R_z$) of this outermost layer 10 was approximately 7 μm.

| Mixture 11 | |
|---|---|
| Polypropylene glycol (PPG; number-average molecular weight of 2,000) | 150 g |
| Polydimethyl siloxane polyol | 50 g |
| Cyclohexane diisocyanate | 32 g |

Outermost Layer 11

The mixture shown by the following mixture 12 was introduced to a 2,000 ml (milliliter) flask with 3 openings and reacted while being agitated for 4 hours under a 100° C. environment to obtain prepolymer with NCO groups at the molecular ends. After this prepolymer was cooled to 50° C., it was mixed with 580 g DMF (dimethyl formamide) to obtain a solution. Then 16 g IPDA (isophorone diamine) were gradually added dropwise to this solution and a chain extension reaction (40° C., 3 hours) was performed to obtain solid content. Twenty parts by weight urethane fine particles (brand name "Seikaseven UP0908", produced by Dainichiseika Co., Ltd. ;average particle diameter of 7 μm) were mixed per 10 parts by weight of this solid content. The outermost layer solution of this mixture diluted to approximately 6% with a mixed solution of DMF:MEK=1:1 was obtained. This outermost layer solution was coated around the conductive elastic layer by dipping and dried for 1 hour at 80° C. to form outermost layer 11. Surface roughness ($R_z$) of this outermost layer 11 was approximately 3 μm.

| Mixture 12 | |
|---|---|
| Polyhexamethylene carbonate diol (number-average molecular weight of 2,000) | 150 g |
| Polydimethyl siloxane polyol (number-average molecular weight of 2,000) | 50 g |
| Cyclohexane diisocyanate | 32 g |

Outermost Layer 12

Twenty parts by weight urethane fine particles (brand name "Seikaseven UP0904", produced by Dainichiseika Co., Ltd.; average particle diameter of 15 μm) were mixed per 100 parts by weight solid content produced by the formation process for above-mentioned outermost layer 11. This mixture was diluted to approximately 6% with a mixed solution of DMF:MEK=1:1 to obtain the outermost layer solution. This outermost layer solution was covered on the conductive elastic layer by dipping and dried for 1 hour at 80° C. to form outermost layer 12. Surface roughness ($R_z$) of this outermost layer 12 was approximately 6 μm.

Outermost Layer 13

Ten parts by weight PMMA particles (brand name "MA1013", produced by Nippon Shokubai Co., Ltd.; average particle diameter of 15 μm) were mixed per 100 parts by weight solid content produced by the formation process for above-mentioned outermost layer 11. This mixture was diluted to approximately 6% with a mixed solution of DMF:MEK=1:1 to obtain the outermost layer solution. This outermost layer solution was covered on the conductive elastic layer by dipping and dried for 1 hour at 80° C. to form outermost layer 13. Surface roughness ($R_z$) of this outermost layer 13 was approximately 6 μm.

Outermost Layers 14 through 18

A mixture of polyol, which was a mixture of polysiloxane polyol and carbonate polyol at a weight ratio of 8:2, and hydrogenated MDI was introduced to a 2,000 ml (milliliter) flask with 3 openings and reacted while being agitated for 4 hours under a 100° C. environment to obtain prepolymer with NCO groups at the molecular ends. After this prepolymer was cooled to 50° C., it was mixed with DMF (dimethyl formamide) to obtain a solution. Then IPDA (isophorone diamine) was gradually added dropwise to this solution and a chain extension reaction was performed at 40° C. for 3 hours to obtain solid content. Twenty parts by weight urethane fine particles (brand name "Seikaseven UP0904", produced by Dainichiseika Co., Ltd.; average particle diameter of 15 μm) were mixed per 10 parts by weight of this solid content. This mixture was diluted to approximately 6% with a mixed solution of DMF:MEK=1:1 to obtain the outermost layer solution. This outermost layer solution was coated around the conductive elastic layer by dipping and dried for 1 hour at 80° C. to form outermost layers 14 through 18. Surface roughness ($R_z$) of these outermost layers was approximately 5 to 7 μm.

TABLE 3

| | 100% modulus ($10^6$ Pa) |
|---|---|
| Outermost layer 14 | 4 |
| Outermost layer 15 | 8 |
| Outermost layer 16 | 17 |
| Outermost layer 17 | 25 |
| Outermost layer 18 | 33 |

Outermost Layer 19

The solid content of polycarbonate urethane (brand name "E-980", produced by Nihon Mirakutoran Co., Ltd.) was diluted to approximately 6% with a mixed solution of DMF:MEK=1:1 to obtain the outermost layer solution. This outermost layer solution was coated around the conductive elastic layer by dipping and dried for 1 hour at 80° C. to form outermost layer 19. Surface roughness ($R_z$) of this outermost layer was approximately 2 μm.

Outermost Layer 20

The solid content of vinylidene fluoride (brand name "Sefral Soft G-180Y", produced by Central Glass K. K.) was diluted to approximately 5% with DMF solution to obtain the outermost layer solution. This outermost layer solution was coated around the conductive elastic layer by dipping and dried for 1 hour at 80° C. to form outermost layer 20. Surface roughness ($R_z$) of this outermost layer 20 was approximately 1 μm.

Outermost Layer 21

The solid content of methoxymethylated nylon (brand name "EM-120". produced by Namariichi Co., Ltd.) was diluted to approximately 10% with methanol obtain the outermost layer solution. This outermost layer solution was coated around the conductive elastic layer by dipping and dried for 1 hour at 80° C. to form outermost layer 21. Surface roughness ($R_z$) of this outermost layer 21 was approximately 1 μm.

The above-mentioned conductive elastic layers and outermost layers were combined as shown in Table 4 to make the developing rollers of Examples 10 through 18 and Comparative Examples 3 through 5. Moreover, the average shortest distance between fine particles ($D_{av}$) and the arithmetical average ($L_{av}$) of the height of the fine particles (L) protruding from the surface of the outermost layer are shown in Table 2. The method of determination of the average shortest distance between fine particles ($D_{av}$) is as described above. Furthermore, the average particle diameter of the toner used in these determinations is set at 10 μm.

TABLE 4

|  | Conductive elastic layer No. | Outermost layer No. | Surface roughness ($R_z$) | Average shortest distance between fine particles ($D_{av}$) | Average protrusion ($L_{av}$) |
|---|---|---|---|---|---|
| Example 10 | 1 | 10 | 7 μm | 60 μm | 7.0 μm |
| Example 11 | 1 | 11 | 3 μm | 83 μm | 2.7 μm |
| Example 12 | 1 | 12 | 6 μm | 63 μm | 6.1 μm |
| Example 13 | 1 | 13 | 6 μm | 98 μm | 6.5 μm |
| Example 14 | 1 | 14 | 5–7 μm | 58 μm | 5.7 μm |
| Example 15 | 1 | 15 | 5–7 μm | 60 μm | 6.0 μm |
| Example 16 | 1 | 16 | 5–7 μm | 62 μm | 5.9 μm |
| Example 17 | 1 | 17 | 5–7 μm | 65 μm | 6.1 μm |
| Example 18 | 1 | 18 | 5–7 μm | 67 μm | 6.3 μm |
| Comparative Example 3 | 1 | 19 | 21 μm | None | None |
| Comparative Example 4 | 1 | 20 | 1 μm | None | None |
| Comparative Example 5 | 1 | 21 | 1 μm | None | None |

The experiments were performed by printing 5,000 black set-solid images using the developing roller in combination with a contact-type developing device. Average particle diameter of the nonmagnetic toner used in the experiments was 10 μm, and the melting point of the nonmagnetic toner was 78° C. A stainless steel regulating blade was used. Evaluation of the experiments was performed on the 3 points of (1) printing density, (2) toner filming, and (3) fusion of toner to regulating blade.

(1) Evaluation of Printing Density

After printing 5,000 black set-solid images, density of the 100th and the 5,000th black set-solid image was determined with a Macbeth densitometer. Density was evaluated as "A" (excellent) when this determination was 1.4 or higher, "B" (fairly good) if it was 1.35 or higher but under 1.4, "C" (insufficient) if it was 1.3 or higher but under 1.35, and "D" (no good) if it was under 1.3.

(2) Evaluation of Toner Filming

The surface of the developing roller after printing 5,000 prints was macroscopically checked and if there was no toner filming whatsoever, it was evaluated as "A" (excellent), it there was almost no toner filming, it was evaluated as "B" (good), and if there was toner filming in several places, it was evaluated as "C" (no good).

(3) Evaluation of Toner Fusion

After printing 5,000 black set-solid images, the regulating blade was macroscopically checked and toner fusion was evaluated as "A" (excellent) when there was almost no fusion of toner on the regulating blade, "B" (good) when there was slight fusion, and "C" (no good) when there was obvious fusion.

These test results are shown in Table 5. It is clear from the results in Table 5 that the developing rollers of the examples show good printing density and prevent toner filming and toner fusion when compared to the Comparative Examples.

TABLE 5

|  | Printing density of 100th print | Printing density of 5,000th print | Toner filming | Toner fusion |
|---|---|---|---|---|
| Example 10 | A | A | A | A |
| Example 11 | A | A | A | A |
| Example 12 | A | A | A | A |
| Example 13 | A | B | B | A |
| Example 14 | A | B | B | A |
| Example 15 | A | A | A | A |
| Example 16 | A | A | A | A |
| Example 17 | A | B | A | A |
| Example 18 | A | B | A | A |
| Comparative Example 3 | A | B | B | C |
| Comparative Example 4 | D | D | C | C |
| Comparative Example 5 | A | C | C | C |

INDUSTRIAL APPLICABILITY

As previously mentioned, the developing roller of the present invention is ideal for incorporation in developing devices that use nonmagnetic one-component developing agents for image-forming devices that employ electrophotography, including copying machines, printers, the receivers of facsimiles, etc.

What is claimed is:

1. A developing roller made by lamination of a single or several elastic layers around a conductive shaft and a single or several resin layers on said elastic layer, said elastic layer has a JIS A hardness of 50 degrees or less and of said single or several resin layers, at least the outermost layer contains fine particles and the surface roughness of said outermost layer is thereby adjusted by the fine particles to within a range of 3 μm to 15 μm.

2. The developing roller according to claim 1, wherein the average particle diameter of said fine particles is 5 to 50 μm.

3. The developing roller according to claim 1, wherein of said single or several resin layers, at least the outermost layer consists of a resin composition comprising —NHCO— bonds.

4. The developing roller according to claim 3, wherein said resin composition comprises repeating units of —ROCO$_2$—.

5. The developing roller according to claim 3, wherein said resin composition comprises repeating units of —SiOSi—.

6. The developing roller according to claim 1, wherein of said single or several resin layers, at least the outermost layer consists of acrylic-vinyl acetate.

7. The developing roller according to any 1 of claims 1 through 6, wherein said fine particles consist of urethane or nylon material.

8. The developing roller according to any 1 of claims 1 through 6, wherein said elastic layer consists of the reaction product of a curable composition whose main components are (A) polymer comprising at least 1 alkenyl group in its molecules and whose repeating units making its main chain mainly consist of oxyalkylene units or saturated hydrocarbon units, (B) curing agent comprising at least 2 hydrosilyl groups in its molecules, and (C) hydrosilylation catalyst, and (D) conductivity-imparting agent.

9. The developing roller according to any 1 of claims 1 through 6, wherein the thickness of the outermost layer containing said fine particles is within a range of 5 to 50 $\mu$m.

10. The developing roller according to any 1 of claims 1 through 6, wherein the outermost layer has a tensile elongation of 300 to 600% in accordance with JIS K 6251.

11. The developing roller according to any 1 of claims 1 through 6, wherein the roller resistance prior to coating said single or several resin layers is $10^4 \Omega$ or more, and the roller resistance after said resin layer coating is $10^4$ to $10^{10} \Omega$.

12. The developing roller according to any 1 of claims 1 through 6, wherein the capacitance of the roller prior to coating said single or several layers is 0.8 to 20 nF, and capacitance after said resin layer coating is 2.5 nF or less.

13. A developing device in which the developing roller of any 1 of claims 1 through 6 is incorporated.

14. A developing roller, characterized in that by means of a developing roller made by lamination of a single or several elastic layers around a conductive shaft and a single or several resin layers on said elastic layer, said elastic layer has a JIS A hardness of 50 degrees or less, of said single or several resin layers, at least the outermost layer comprises fine particles so that fine particles protrude from the surface of said outermost layer, and when height of the fine particles protruding from the above-mentioned surface is L, toner mean particle diameter is $r_{av}$, and mean distance between the fine particles that protrude from the above-mentioned surface is $D_{av}$, the correlation of $r_{av} \leq D_{av} \leq 80L$ is established with respect to the fine particles that satisfy the correlation $r_{av}/4 \leq L \leq 4r_{av}$.

15. The developing roller according to claim 14, where said toner mean particle diameter $r_{av}$ is within a range of 5 to 10 $\mu$m.

16. A developing device in which the developing roller of claim 14 or claim 15 is incorporated.

* * * * *